US006465788B1

(12) United States Patent
Medley

(10) Patent No.: US 6,465,788 B1
(45) Date of Patent: Oct. 15, 2002

(54) RUGGEDIZED PHOTOMULTIPLIER TUBE AND OPTICAL COUPLING IN ARMORED DETECTOR

(75) Inventor: Dwight Medley, Kelso, TN (US)

(73) Assignee: Frederick Energy Products LLC, Huntsville, AL (US)

( * ) Notice: Subject to any disclaimer, the term of this patent is extended or adjusted under 35 U.S.C. 154(b) by 119 days.

(21) Appl. No.: 09/626,744

(22) Filed: Jul. 26, 2000

Related U.S. Application Data

(63) Continuation-in-part of application No. 09/471,122, filed on Dec. 23, 1999.

(51) Int. Cl.[7] .......... G01T 1/20
(52) U.S. Cl. .......... 250/368
(58) Field of Search .......... 250/368

(56) References Cited

U.S. PATENT DOCUMENTS

| | | | | |
|---|---|---|---|---|
| 2,752,591 | A | | 6/1956 | Felbeck et al. |
| 3,015,477 | A | | 1/1962 | Persson et al. |
| 3,019,338 | A | | 1/1962 | Monaghan et al. |
| 3,550,959 | A | | 12/1970 | Alford |
| 3,930,160 | A | | 12/1975 | Swinehart |
| 4,155,594 | A | | 5/1979 | Hartley et al. |
| 4,157,204 | A | | 6/1979 | Kissell et al. |
| 4,200,335 | A | | 4/1980 | Moynihan et al. |
| 4,262,964 | A | | 4/1981 | Ingle et al. |
| 4,367,899 | A | | 1/1983 | Whittaker et al. |
| 4,632,462 | A | | 12/1986 | Poling |
| 4,753,484 | A | | 6/1988 | Stolarczyk et al. |
| 4,904,865 | A | * | 2/1990 | Meisner et al. ............. 250/254 |
| 4,968,098 | A | | 11/1990 | Hirsch et al. |
| 4,981,327 | A | | 1/1991 | Bessinger et al. |
| 5,070,249 | A | | 12/1991 | White |
| 5,092,657 | A | | 3/1992 | Bryan, Jr. |
| 5,334,838 | A | | 8/1994 | Ramsden, Jr. |
| 5,357,413 | A | | 10/1994 | Mandall |
| 5,407,253 | A | | 4/1995 | Page et al. |
| 5,632,469 | A | | 5/1997 | Heun et al. |
| 5,742,057 | A | | 4/1998 | Frederick et al. |
| 5,769,503 | A | | 6/1998 | Stolarczyk et al. |
| 5,796,109 | A | | 8/1998 | Frederick et al. |
| 5,962,855 | A | * | 10/1999 | Frederick et al. ....... 250/361 R |
| 6,355,932 | B1 | | 3/2002 | Frederick |

* cited by examiner

*Primary Examiner*—Constantine Hannaher
(74) *Attorney, Agent, or Firm*—Nixon & Vanderhye P.C.

(57) ABSTRACT

A photomultiplier tube and a method and apparatus for molding an optical coupler thereto are described. An optical coupler molding fixture includes a frame and a frame base. A photomultiplier tube is positioned within the frame between a spring and a shim. The optical coupler is formed with a mold which is positioned against the shim. A cavity is created radially interior to the shim between the photomultiplier tube and the mold. The optical coupler is molded to a faceplate of the photomultiplier tube with the fixture oriented so that its longitudinal axis L is parallel to the ground. A clamping structure presses the mold against the shim and provides the optical coupler material a non-leak space in which to cure. The optical coupler material is injected into the mold through a fill hole, and may be injected at ambient temperature. Curing time may range from one week at ambient temperatures to four hours at 65° C. The mold can be machined to create any form desired for the optical coupler. The shim can be sized and configured to allow for adjustment in the thickness of the optical coupler. The optical coupler may be as thin as less than 0.015 inches in thickness. If, for example, a thicker optical coupler is desired, the shim may be made thicker. The edge of the photomultiplier tube housing which abuts the shim is checked for its perpendicularity to the longitudinal axis L. Without perpendicularity, proper alignment of the photomultiplier tube is less likely.

47 Claims, 13 Drawing Sheets

RUGGEDIZED PHOTOMULTIPLIER TUBE AND OPTICAL COUPLING IN ARMORED DETECTOR

This is a continuation-in-part of U.S. patent application Ser. No. 09/471,122, filed Dec. 23, 1999, the entire disclosure of which is incorporated herein by reference.

BACKGROUND

The invention described herein generally relates to an apparatus for detecting the presence of rock during coal mining operations, and more particularly, to an armored detector system, utilizing sensitive monitoring equipment, such as radiation detecting equipment, which is used in mining operations to allow removal of essentially all the coal with very little cutting into the rock above and below the coal.

The use of sensitive monitoring equipment in mining operations is well known. It is further known that radiation sensors in particular are well suited for use in coal mining operations. Their conventional use allows for limited control of the cutting depth for a variety of continuous excavators used in mining operations. However, effective use of gamma detectors has been impaired due to the inability to place the detectors such that they can accurately measure the thickness of the coal remaining to be cut or, in effect, to accurately measure the distance between the cutter and the rock that is to be avoided. Conventionally, suitably sized detectors have only been able to make real-time measurements at locations other than in the region actively being cut and then have inferred or calculated, in a somewhat indirect manner, the parameter that ultimately must be known; namely, the distance from the cutter to the rock. Further, such conventional approaches have tried to project cutting decisions to future or succeeding cuts rather than making real time cutting decisions during the current cutting stroke. Such approaches have only had limited success, particularly on continuous miners, because of the large variations in the formations, cutting conditions and other operational variables.

In coal mining operations, radiation sensors, such as gamma sensors, are currently used to detect radiation emissions from layers of fireclay and shale and other non-coal materials in the surrounding ground. Radiation is emitted from non-coal layers in various quantities dependent upon the type of non-coal material. As the radiation passes through the coal from the rock, it is attenuated. It is this attenuation that is measured, or counted, to determine when cutting should be halted to avoid cutting into the rock. Counting gamma rays must be accomplished over a period of time because the nature of radiation is statistical, having an emission rate that is represented by a Gaussian distribution around some central value.

The most accurate measurements of the distance from the cutter to the rock to be avoided is to place the sensor near the region of the mineral being cut, rather than at a distance away or near some other region. Data must be accumulated over time in order to average the readings so as to establish that central value. Since the radiation in a coal mines is relatively weak, the view angle needs to be large in order to obtain data in a sufficiently short time in order to be used to control real-time cutting actions. But, large view angles in conventional devices have resulted in viewing radiation sources other than from the region that needs to be measured so this makes the measurement inaccurate. In other words, choosing a narrow viewing angle has reduced the count rate, requiring more time which resulted in decreasing the accuracy since the miner is active and must continue. But, making the view angle wider also has reduced the accuracy.

It is also known that radiation detecting equipment is sensitive and must be protected from harsh environments to survive and to produce accurate, noise free signals. This protection must include protection from physical shock and stress, including force, vibration, and abrasion, encountered during mining operations. However, the closer in proximity equipment is to the mineral being mined, the greater is the shock, vibration and stress to which the equipment is subjected. Thus, there is a tension between placing conventional radiation detectors close to the surface being mined to make accurate measurements and providing adequate protection to ensure survival of the sensor and to avoid degradation of the data by the effects of the harsh environment. Conventionally, the need to assure survival of the sensor has resulted in placement of the sensor away from the target of interest. Another conventional approach has been to make the sensing element smaller so that it can be more easily placed in a strategically desirable location, but the sensitivity of the element drops as the size is reduced, and again, the accuracy reduces in a corresponding fashion.

It is important for ensuring reliable data that excess noise and/or degradation of data due from shock be reduced. To optimize the efficiency of the transmission of data from a scintillation element to a photomultiplier tube, it is known to place an optical coupling between the element and the tube. The optical coupling may entail applying optical grease to a window for the scintillation element and a faceplate of the photomultiplier tube and pressing the window and faceplate together. Such interfaces are unreliable under high vibration and shock and degrade over time as the grease tends to migrate from the interface.

Another optical coupling is directly bonding the photomultiplier tube faceplate to the window or to the scintillation element itself. While such an interface is generally of good quality, it requires special skills and equipment to perform the bond properly. Further, such a bond does not allow easy separation or replacement (especially within an explosion-proof housing) and it dynamically connects the photomultiplier tube and the scintillation element together.

Yet another optical coupling is placing an elastomeric transparent disk between the photomultiplier tube and the scintillation element with grease on either side. Disadvantages to this optical coupling include that the grease tends to migrate from the interfaces, changing the optical coupling properties, and that noise may be created. Further, in some configurations, such an optical coupling is difficult to install and retain.

Instead of smooth surfaces, some optical coupler disks have oil retaining rings, such as described in U.S. Pat. No. 5,962,855 (Frederick et al.). Such optical coupler disks have disadvantages when the photomultiplier tube is installed into an explosion-proof housing, since absolute precision regarding the placement of the optical coupler disk between the photomultiplier tube and the scintillation element is essential.

One method of mining coal is continuous mining, in which tunnels are bored through the earth with a machine including a cutting drum attached to a movable boom. The operator of a continuous mining machine must control the mining machine with an obstructed view of the coal being mined. This is because the operator is situated a distance from the cutting made by the picks on the cutting drum and his v iew is obstructed by the portions of the mining machine as well as dust created in the mining operation and water sprays provided by the miner. Another method of mining coal is longwall mining, which also involves the use of a cutting drum attached to a boom. In longwall mining, as compared with continuous mining, the drum cuts a swath of earth up to one thousand feet at a time. Both continuous mining machines and longwall mining machines are used in very harsh conditions.

Space for installing a gamma detector on a continuous miner is very limited since the detector must be positioned in a specific location in order to be in view of the coal to rock interface. The presence of armor, which is required to protect the detector, further limits the available space. An explosion-proof housing takes up even more of the available space, and often results in reducing the diameter of the photomultiplier tube. As the diameter of the photomultiplier tube is reduced, the efficient transfer of light to the tube becomes more critical. The optical coupling thus must be as thin as possible while remaining durable.

SUMMARY

The invention provides a photomultiplier apparatus for use with a gamma detector which includes a photomultiplier tube, a faceplate located on an end of the photomultiplier tube, and an optical coupler molded to the faceplate.

The invention also provides a gamma detector that includes a scintillation element and the photomultiplier apparatus.

The invention also provides a method of molding an optical coupler directly to a photomultiplier tube. The method includes placing the photomultiplier tube within an optical coupler molding fixture. The fixture includes a frame with a frame base, a clamping structure, a shim, and a mold. The method further includes the steps of abutting one end of the photomultiplier tube against the shim, centering the photomultiplier tube within the frame, clamping the mold onto the shim, injecting an optical material into the mold, and curing the material.

The invention further provides an optical coupler molding fixture for molding an optical coupler onto a photomultiplier tube. The fixture includes a frame with a frame base, the frame being adapted to receive a photomultiplier tube, a shim, a mold, and a clamping structure for clamping the frame base and the mold toward said shim.

These and other advantages and features will be more readily understood from the following detailed description of preferred embodiments of the invention which is provided in connection with the accompanying drawings.

DETAILED DESCRIPTION OF PREFERRED EMBODIMENTS

Figure 1:
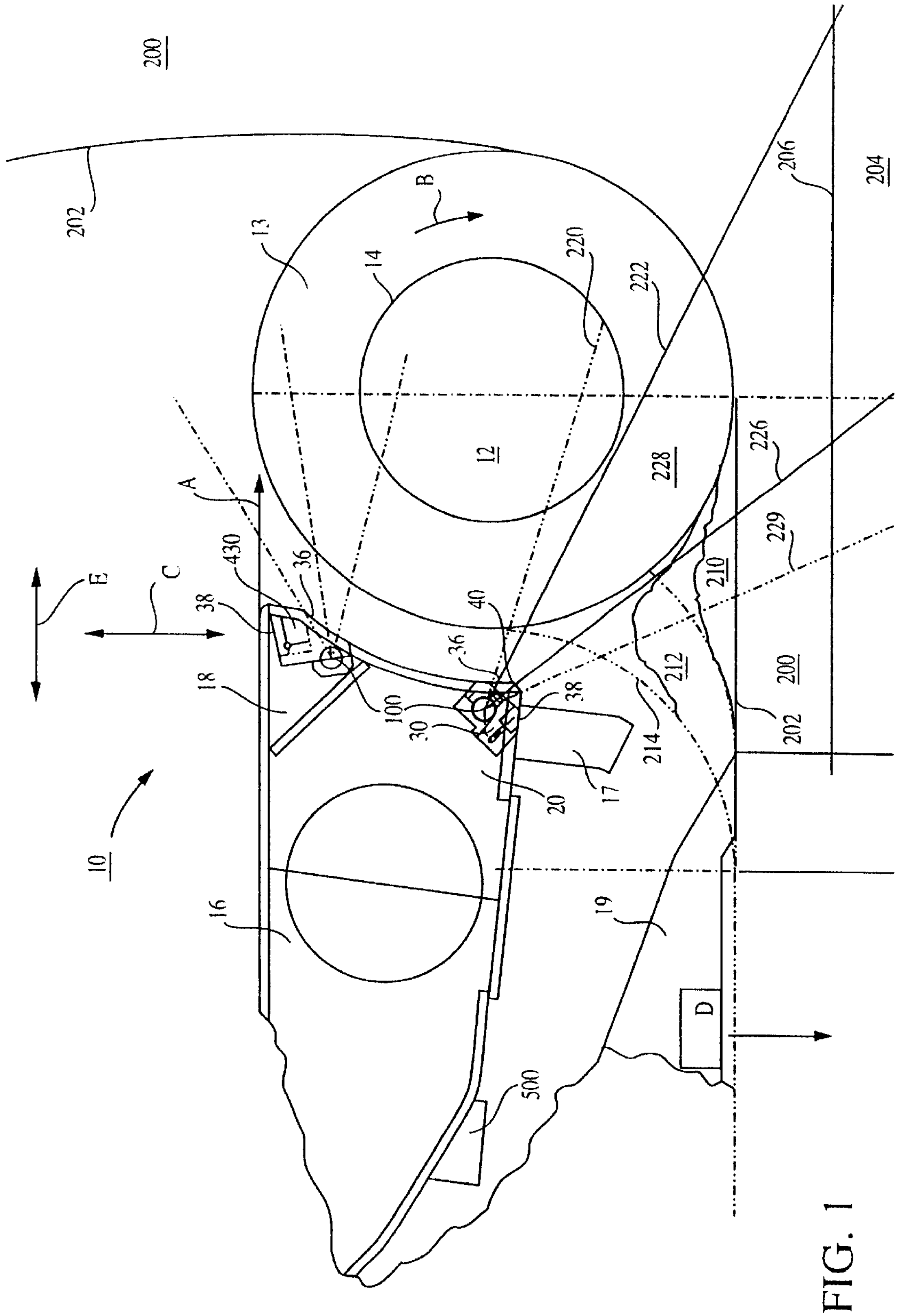
FIG. 1 is a schematic view from a side of a continuous miner including an armored detector assembly constructed in accordance with a preferred embodiment of the present invention.

An armored detector assembly 30 for housing sensing equipment 100 used in mining operations is illustrated attached to mining equipment 10 in FIG. 1. The mining equipment 10 shown is a continuous mining machine. The mining equipment 10 includes a movable boom 16 attached to a cutting drum 12. The cutting drum 12 has an exterior surface 14 upon which are mounted cutting tools or picks 13 shown schematically. The mining equipment 10 further includes a chute 19 into which cut coal is shunted for further processing. The boom 16 is capable of being moved in the direction of arrows C while the mining equipment can move in the direction of arrows E perpendicular to the arrows C. At a lower extent of the mining boom 16 is a boom stop 17. The boom 16 is prevented from moving downwardly past a certain point by the boom stop 17 which contacts the chute 19.

Shown on the mining boom 16 of FIG. 1 are two armored detector assemblies 30, 430. The nearest point on the boom 16 to the cutting drum 12 is at the front of the boom 16, either at the top or the bottom edge. The armored detector assembly is advantageously located in an upper portion 18 of the boom 16 f)r detecting the roof coal-rock interface (not shown), or alternatively the armored detector assembly may be located in a lower portion 20 of the boom 16 for detecting a floor coal-rock interface 206. Instead, and as illustrated, the armored detector assembly 30 is located in the lower portion 20 of the boom 16 and the armored detector assembly 430 is located in the upper portion 18 of the boom 16. From either of the portions 18, 20 the detector assemblies 30, 430 have a view between the picks 13 on the cutting drum 12 to the respective floor or roof surface being cut, or a coal face 202 of a layer of uncut coal 200. The uncut coal 200 is the target stratum for the operator of the mining equipment 10.

The detector assemblies 30, 430 further may be placed at any location laterally along the width of the mining boom 16. There may be instances where the positioning of the detector assemblies 30, 430 is more advantageous. For example, after the mining equipment 10 makes a first cutting pass, it may then reverse out from the coal face 202, move laterally, and begin a second cutting pass. There will sometimes be overlap between the first and the second cutting passes. If the detector assemblies 30, 430 are positioned so as to have a view of uncut coal, even with the overlap, the detector assemblies 30, 430 may have a less obstructed viewing area.

Generally, coal is found in strata sandwiched between a layer of impervious shale above and a layer of a rock material 204, such as, for example, fireclay below. Sometimes iron sulfide masses form in or beneath the shale layer. Iron sulfide masses are extremely dense, hard material which can damage the picks 13. In addition to determining a coal-rock interface 206 between the layer of uncut coal 200 and the rock material 204, the detector assembly 30 is capable of determining the presence of iron sulfide masses. Thus, positioning a detector assembly 30 in the upper portion 18 has the added benefit of inhibiting damage to the picks 13 by advising the operator of the mining equipment 10 of the nearby presence of iron sulfide masses.

As the picks 13 of the cutting drum 12 contact with the coal face 202, some of the uncut coal 200 is cut and moved in a direction toward the chute 19. Depending upon how the operator operates the mining equipment 10, some mounds of uncut coal 200 may remain between the mining equipment 10 and the coal face 202. The size of the mound depends upon the depth of the cut. For example, if the mining equipment 10 is sumped into the coal by approximately ⅔ the diameter of the cutting picks 13, then the mound would be approximately as shown in 210. But, if the equipment 10 is sumped into the coal by approximately the diameter of the cutting picks 13, then the mound would be approximately as shown in 212. Theoretically, the uncut coal area could approximate the area bounded by a theoretical cut coal line 214, the picks 13, and the coal face 202. However, due to vibration of the mining equipment 10 and movement of the cutting drum 12, some of the uncut coal generally breaks down and is shunted toward the chute 19, leaving either the first uncut coal area 210 or the second uncut coal area 212. It should be noted that the operation of the mining equipment 10 may not always be consistent, and so the mounds of uncut coal may vary between the first uncut coal area 210 and the second uncut coal area 212.

Vibration levels are high throughout the mining equipment 10, between are highest near the cutting drum 12. In addition to the vibration due to the rotation of the cutting drum and the cutting action of the picks 13 against the coal face 202, the cutting drum 12 continually throws materials being mined at and onto the boom 16. Specifically, the cutting drum 12, which rotates in the direction B, throws material toward the boom 16. High force impacts from the materials thrown onto the boom 16 are abrasive and can substantially erode the steel plates used in the boom 16. Any structure protruding from the surface of the boom 16 likely will be broken off due to the impacts from the thrown materials. Thus, the armored detector assemble 30 is formed of a material capable of being welded to the mining equipment 10. Preferably, part or all of the armored detector assembly 30 is made from a high strength material, such as case hardened steel or a high strength steel alloy, that is adapted to highly attenuate gamma radiation. Further, the armored detector assembly 30 is affixed to the boom 16 such that it is flush with the surface of the boom 16, either in portion 18 or portion 20.

Figure 2:
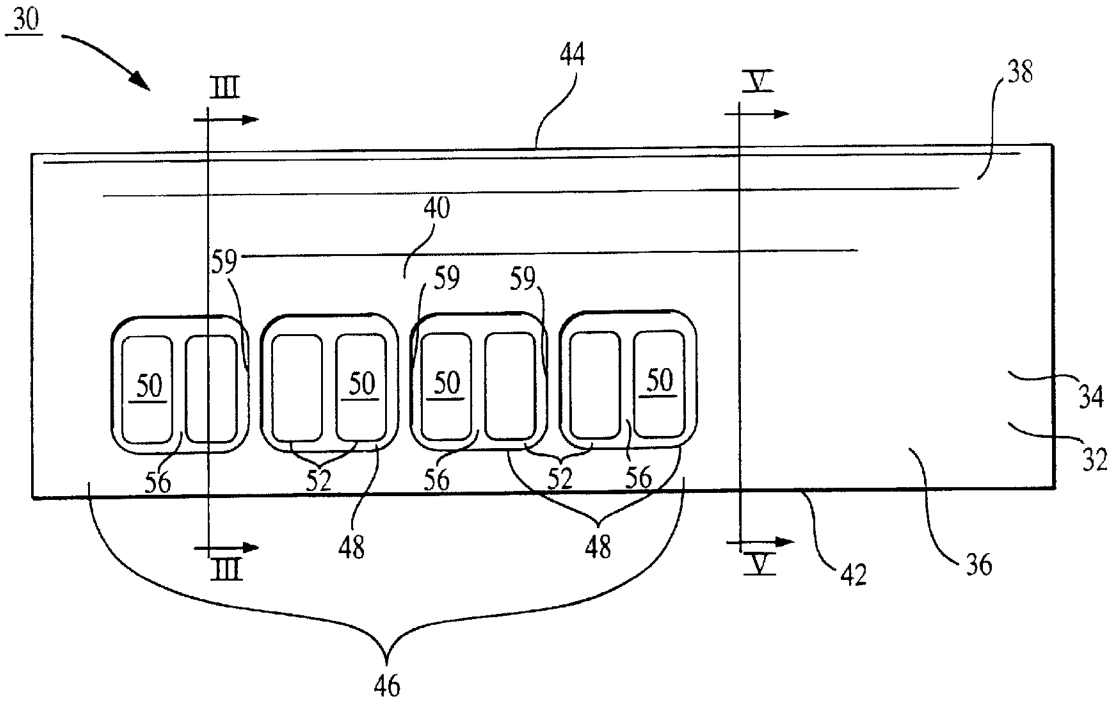
FIG. 2 is a top view of the armored detector assembly of FIG. 1.

Referring now to FIGS. 2–9, wherein the armored detector assembly 30 is further illustrated. FIG. 2 illustrates the armored detector assembly 30 from an end. As shown, the armored detector assembly 30 includes a main assembly 32 and a hatch assembly 74. The main assembly 32 is defined on its exterior by a front surface 42, a front sloping surface 36, a top surface arch 40, a back sloping surface 38, a back surface 44, a back undersurface 62, a back shoulder 64, an internal arch surface 66, a front abutment undersurface 72, a front shoulder 70, and a front undersurface 68. The front sloping surface 36 faces generally toward the viewing area bounded by the theoretical sight line 220 and the lower full view line 226 (FIG. 1). The hatch assembly 74 is defined on its exterior by a front surface 90, a forward surface 88, a shoulder 86, a top surface 84, an arched surface 82, a ledge 80, a flange 76 having a back surface 78, and an undersurface 92.

The main assembly 32 fits against the hatch assembly 74 such that the back surfaces 44, 78 are within the same plane and the front surfaces 42, 90 are within the same plane. When so fitted, the flange 76 abuts the back portion undersurface 62, the ledge 80 abuts the back shoulder 64, the top surface 84 abuts the front abutment undersurface 72, the shoulder 86 abuts the front shoulder 70, and the fores and surface 88 abuts the front undersurface 68. Further, the edges of the arched surface 82 meet up with and contact the edges of the internal arch surface 66 to define a space into which the sensing equipment 100 is held. The placement of the sensing equipment 100 in a space between the main and base assemblies 32 and 74 places a significant portion of rugged housing between the sensitive sensing equipment 100 and the harsh cutting environment near the cutting drum surface 14, specifically the back sloping surface 38 and top surface arch 40 of the main assembly 32.

In addition to the structural features described above, the illustrated main assembly 32 contains a channel 58 which is in fluid connection to fluid equipment (not shown). Also located along the front slope 36 of the main assembly is at least one window opening 48 within a window 46. Extending upwardly from the fluid channel 58 toward the front sloping surface 36 are a plurality of spray orifices 60 (see FIGS. 3 and 6). At least one of the spray orifices 60 exits into the front sloping surface 36 at a location adjacent to the top surface arch 40. Further, a spray orifice 60 exits into each window opening 48, specifically into a back wall 54, and are so positioned to remove some or all of the mining debris thrown up onto the window openings 48 from the mining operations.

Figure 3:
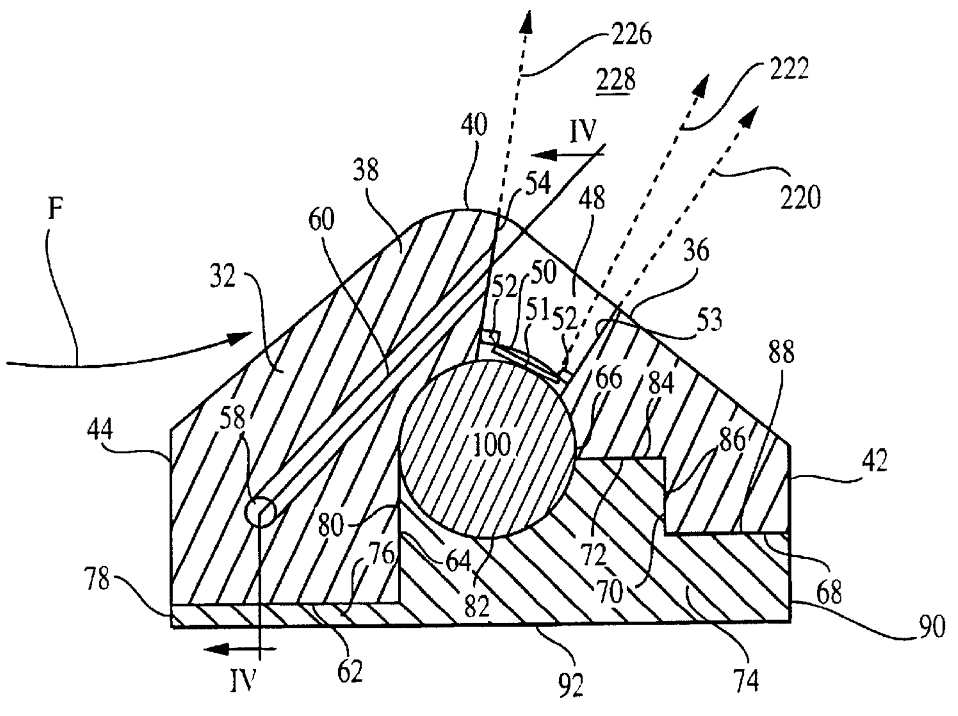
FIG. 3 is a cross-sectional view taken along line III—III of FIG. 2.

The sloped features of the main assembly 32, namely the front and back sloping surfaces 36 and 38 are so configured to deflect to some extent mining debris thrown up onto the armored detector assembly 30. Specifically, since the cutting drum 12 rotates in the direction B, debris is thrown up at the detector assembly 30 generally in the direction of arrow F (FIG. 3). Thus, the back surface 38 takes a majority of the force of the thrown debris, and the window openings 48 are shielded from the majority of the thrown debris. The main assembly 32 and the hatch assembly 74 arc mechanically fastened together and are removable from one another to allow removal of the sensing equipment 100.

FIG. 2 shows the armored detector assembly 30 from the top located on the front surface 36 of the armored detector assembly 30 adjacent to the top surface arch 40 is the window 46 consisting of four window openings 48. Each window opening 48, which is partially defined by the back wall 54 and a front wall 53, is recessed into the main assembly 32 and contains a pair of apertures 50 within a window base surface 52 and separated by a window guard 56. The window guards 56 are made from a high strength material and the window openings 48 are sized and configured to restrict the size of debris that impacts the window apertures 50 during mining operations. The window apertures 50 are underlain by a non-metallic material 51 (FIG. 7) which is essentially transparent to radiation, such as urethane. Further included within the window openings 48 are side window panes 59 (FIGS. 2, 6), as which allow radiation moving transverse to the window apertures 50 to be transmitted from one window opening 48 to another to prevent obstructing transverse radiation. Please note that the side window pane 59 is not shown in FIG. 3 for clarity of illustration. The window openings 48 provide a recessed area within the front sloping surface 36 to provide added protection for the transparent material 51 underlying the window apertures 50.

The detector assembly 30 is positioned such that the viewing area of the window openings 48 is bounded by an upper theoretical sight line 220 and a lower theoretical sight line 229 (FIGS. 1, 3). As you will note, the upper theoretical sight line 220 extends from the front walls 53 through the cutting drum 12, which severely attenuates the radiation information from the rock material 204. The actual upper boundary is the upper full view line 222 which extends from the window apertures 50 and tangents the exterior surface 14 of the cutting drum 12 and extends through the pick region 13. The maximum viewing of the detector assembly 30, meaning the full viewing area of each of the window openings 48 is a full viewing area 228 bounded by the upper full view line 222 and a lower full view line 226. The full viewing area 228 is less than the area of viewing between the lower full view line 226 and the theoretical sight line 220. Partial viewing by the detector assembly 30 is also possible between the lower full view line 226 and the lower sight line 229 (FIG. 1). Full viewing between the lower full view line 226 and the lower sight line 229 is inhibited by the back wall 54 of each window opening 48.

Optimal collection of radiation information can be obtained from the full viewing area 228. This is because coal being cut from the coal face 202 Which is within the pick region 13 is less dense than the coal in the coal layer 200 and in the first and second areas of uncut coal 210, 212. This is due to cut chunks of coal being mixed up, and in motion in the pick region 13. The less dense the coal is in the full viewing area 228, the less the radiation from the rock 204 is attenuated before passing into the detector assembly 30.

As the picks 13 approach the rock interface 206, the boom 16 movement is slowed down which allows the picks 13 to remove most of the cut coal from region 228. Although movement of the boom 16 is slowed, the rotational speed of the cutting drum 12 remains constant. This allows the coal cutting rate to be decreased, thereby allowing cut coal to be more sufficiently cleared by the picks 13 to the chute 19.

Less reliable though still somewhat important radiation information may be obtained from the viewing area bounded by the lower full view line 226 and the lower sight line 229. This information is more important when the picks 13 are at greater distances from the rock interface 206, because that information is used in making the first logical decision to slow the motion of the boom 16. The radiation in formation from this viewing area is less reliable when the picks 13 are closer to the rock interface 206 due to the variability of the sizes and configurations of the uncut coal areas 210, 212 but the contribution from this region is proportionally small at this point in the cutting stroke.

Figure 4:
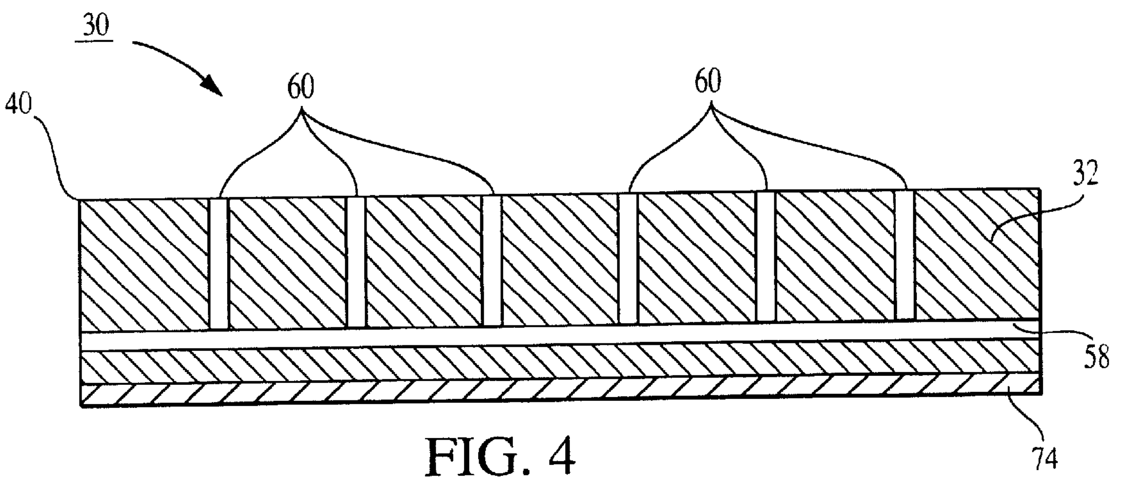
FIG. 4 is a cross-sectional view taken along line IV—IV of FIG. 3.

FIG. 4 is a cross-sectional view of the armored detector assembly 30 showing the channel 58 in fluid connection with the spray orifices 60. The spray orifices 60 connect with the channel 58 and extend toward front sloping surface 36. The spray orifices 60 are arranged to optimize mining debris removal. Specifically, some of the fluid transported through the channel 58 exits the spray orifices 60 in the back walls 54 over the window apertures 50. This fluid serves to wet debris which has collected within the window openings 48. Wet debris becomes softer and more pliable, and the wetness thus inhibits the debris from becoming compacted against the window apertures 50. Debris which becomes so compacted increases the force placed on the window apertures 50 and the underlying transparent material 51, thereby increasing the likelihood that the transparent material 51 can be broken by material that is driven into the assembly by the rotating picks 13.

The remainder of the fluid exits the spray orifices 60 which extend to the front surface 36. This fluid provides a spray over the picks 13 to inhibit dust from remaining borne in the atmosphere. Coal dust is incendiary and can ignite from a spark. Sparks are often created in coal mines through the action of the cutting drum 12 against rock and metal, such as iron sulfide.

Figure 5:
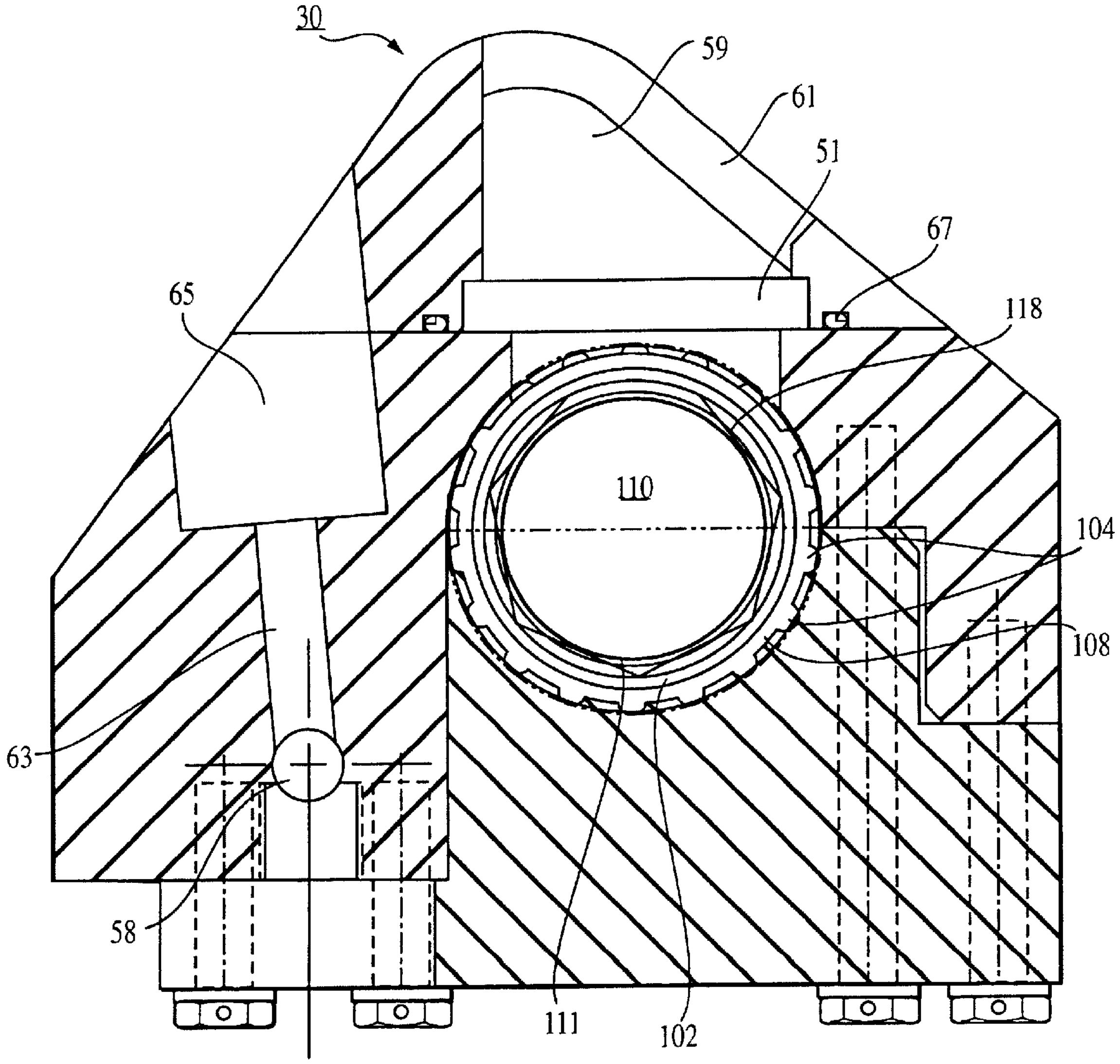
FIG. 5 is a cross-sectional view taken along line V—V of FIG. 2.

FIG. 5 shows another cross-sectional view of the armored detector assembly 30. This view shows a scintillation element 110 housed in a thin housing 1 11. A plurality of springs 118 are positioned between the housing 111 and a rigid enclosure 102. As shown, there are six springs 118. An elastomeric sleeve 108, having a plurality of elastomeric ridges 104, is exterior to the rigid enclosure 102. This whole assembly fits within the area for the sensing equipment 100. The springs 118 are absent directly beneath a transparent material 51. An O-ring 67 extends around the transparent material 51 to seal the sensing equipment 100 from water and contaminants. A main sprayer 65 is also shown in fluid connection with the fluid channel 58 by wax of a spray channel 63. The main sprayer 65 sprays the coal to lessen the likelihood of a possible ignition of the coal dust.

Figure 6:
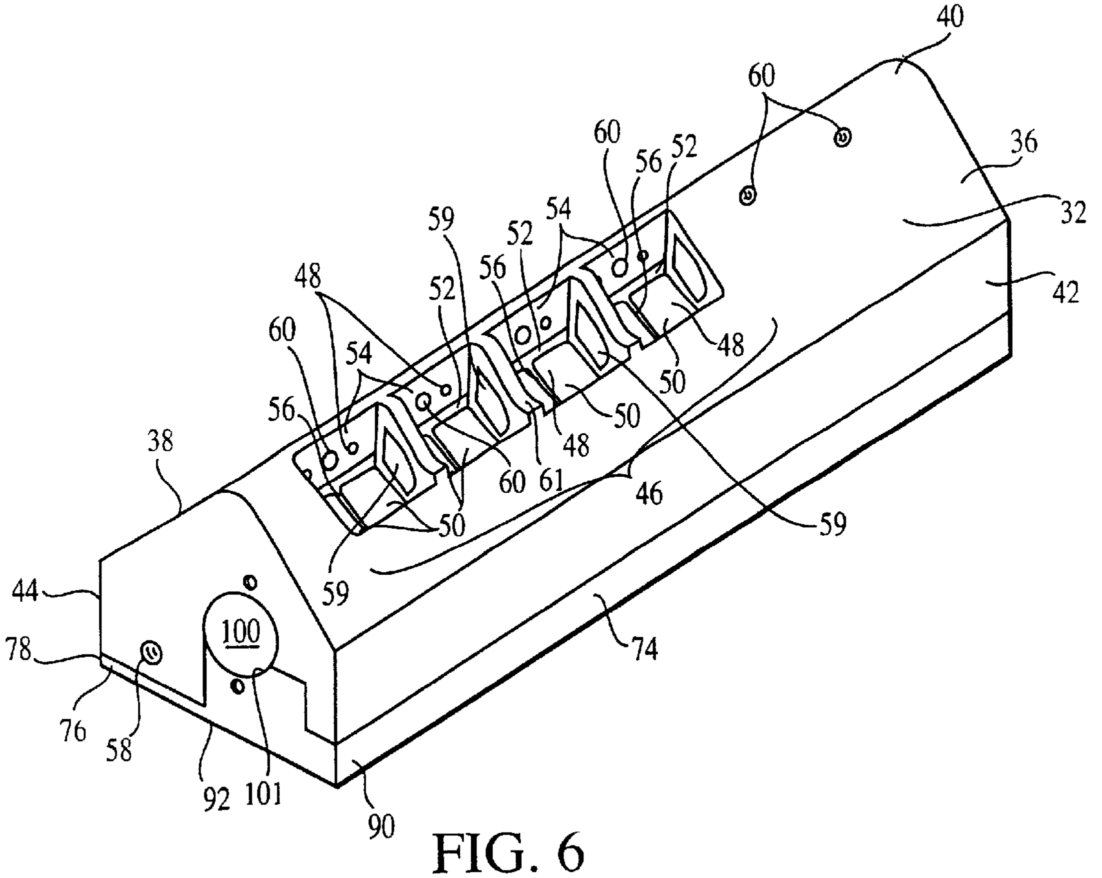
FIG. 6 is a perspective view of the armored detector assembly of FIG. 1.
Figure 10:
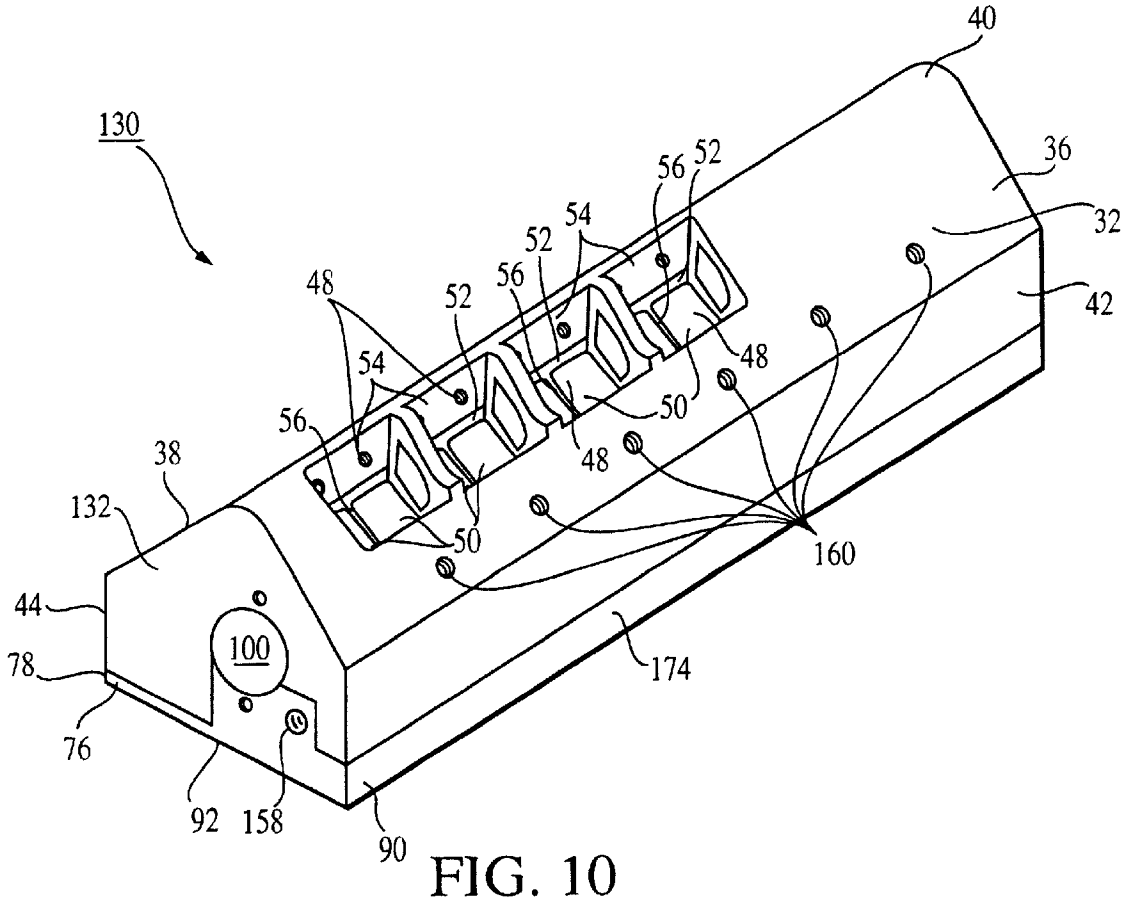
FIG. 10 is a perspective view of an armored detector assembly in accordance with another embodiment of the present invention.

FIG. 6 is a perspective view of the armored detector assembly 30 providing a different view of the exit of the spray orifices 60 within the window openings 48 and into the sloping surface 36, as well as of the side window panes 59 fitting within guards 61. An alternative embodiment, as illustrated in FIG. 10, shows an armored detector assembly 130 having a main assembly 132 and a hatch assembly 174. The major difference between the assembly 30 and the assembly 130 is the exit location of the spray orifices. In the armored detector assembly 130, spray orifices 160 exit into the sloping front surface 36 at a position below the window openings 48. Further, a fluid channel 158 extends through the hatch assembly 174 and is in fluid connection with the spray orifices 160 similar to the fluid channel 58 being in fluid connection with the spray orifices 60.

Although not shown, it is contemplated that spray orifices could be likewise located adjacent to the window openings 48 and/or the window apertures 50. For example, spray orifices may be located to either side and between each window opening 48. Further, spray orifices may be positioned in the window base surface 52 and/or the window guard 56.

Figure 7:
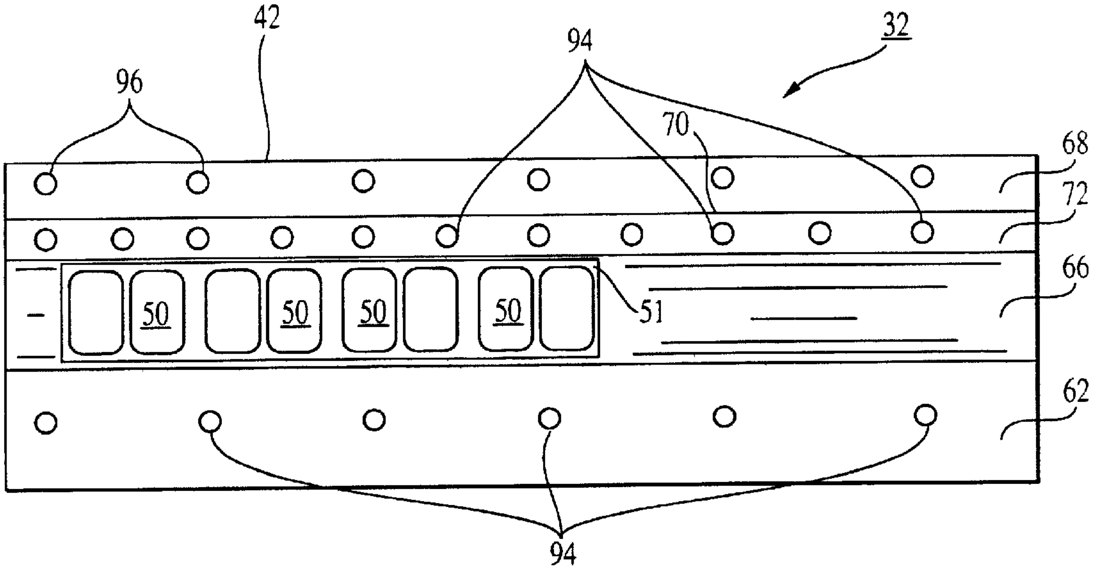
FIG. 7 is a view of the bottom of the main assembly of the armored detector assembly of FIG. 1.

FIG. 7 is a view from the bottom of the main assembly 32. The window apertures 50 extend through the internal arch surface 66. The transparent material 51 is positioned directly beneath the internal arch surface 66 at a location covering the window apertures 50. The interior surface of the main assembly 32 contains a plurality of internal threaded openings 94 located along the back portion undersurface 62, the front portion shoulder 70, and the front portion abutment undersurface 72. There are also a plurality of external threaded openings 96 located along the front portion undersurface 68 and the front surface 42 of the main assembly 32.

Figure 8:
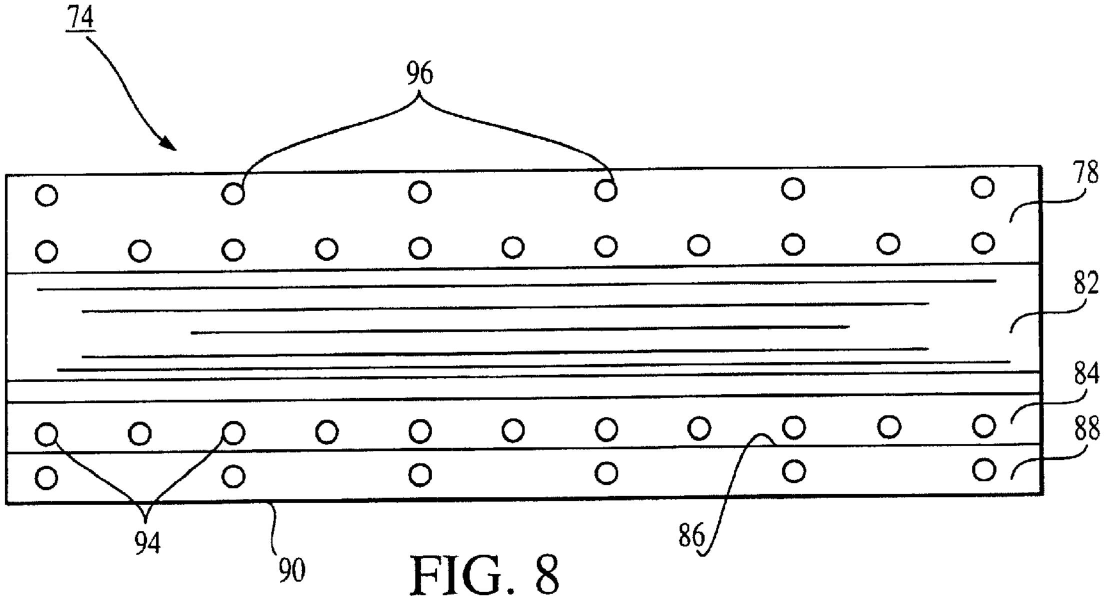
FIG. 8 is a view of the top of the hatch assembly of the armored detector assembly of FIG. 1.

FIG. 8 is a view from the top of the hatch assembly 74. The hatch top surface 84 of the hatch assembly 74 contains a plurality of external threaded openings 96 located along the flange back surface 78 and hatch front surface 90. The hatch assembly 74 also contains a plurality of internal threaded openings 94 located along the hatch shoulder 86. Also shown is the arched surface 82 that supports the sensing equipment 100. The external threaded openings 96 of the main assembly 32 (FIG. 7) match up with the external threaded openings 96 of the hatch assembly 74 (FIG. 8), and each opening 96 is respectively connected to another opening 96 by way of a threaded connecting structure (not shown), such as, for example, screws, bolts, or the like. Each internal threaded opening 94 of the main assembly 32 (FIG. 7) also matches up and is connected to a respective internal threaded opening 94 of the hatch assembly 74 (FIG. 8) in a similar manner as the external threaded openings 96.

Figure 9:
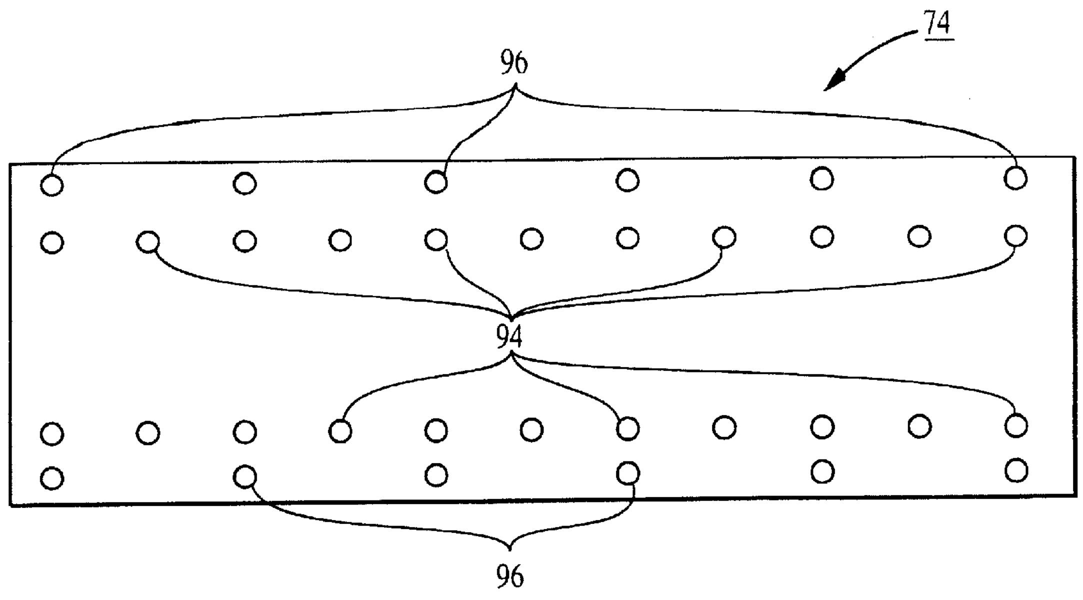
FIG. 9 is a view of the bottom of the hatch assembly of the armored detector assembly of FIG. 1.

FIG. 9 is a view from the bottom of the hatch assembly 74 which has a plurality of internal threaded openings 94 and external threaded openings 96.

The exact positioning of the armored detector assembly 30 is determined by the physical characteristics of the mining equipment 10. For example, the armored detector assembly 30 may be positioned along the mining boom 16 so as to optimize the operations of the sensing equipment 100. One advantage of the illustrated embodiments is the location of the armored detector assembly 30 on the milling boom 16 close to the cutting drum 12. Such positioning permits more precise determination of the coal-rock interface 206. The armored detector assembly 30 may be welded to the mining boom 16 in the optimal location. As noted above, the armored detector assembly 30 is extremely rugged to allow closer placement to the cutting drum 12.

Another advantage is that the channel 58 is connected to the fluid source of the mining equipment 10, and with the spray orifices 60 minimizes the amount of debris covering the window openings 48. The presence of the spray orifices 60 internal to the main assembly 32 and adjacent to the window openings 48 allows the debris to be continually removed, thus improving the accuracy of the radiation information obtained by the sensing equipment 100. The use of a non-metallic low radiation attenuation material 51 beneath the window apertures 50 permits a greater amount of radiation information to reach the sensing equipment 100.

Because the hatch assembly 74 and main assembly 32 are detachable, any damage that does occur to the sensing equipment 100 and the window openings 48 can be repaired or rectified through replacement easily. The hatch assembly 74 is welded flush with the surface of the mining boom 16 to resist being torn off during mining operations.

Referring to FIGS. 11–14, the sensing equipment 100 includes a scintillation crystal 110, a photomultiplier tube 114 within a housing 139, and a power supply, a signal conditioner, and logic circuitry and software, all generically denoted as power and logic elements 116, all being part of a radiation detector 100. While a radiation detector is described as the sensing equipment 100, other sensing equipment, such as neutron or other nuclear detectors, or light, infrared, radio wave, or acoustical sensors may be used to detect the presence of coal. Any sensing equipment capable of detecting signals, from the rock 204 or the coal 200, which enhance the accuracy of determining the coal-rock interface 206 is suitable for the present invention.

Figure 12:
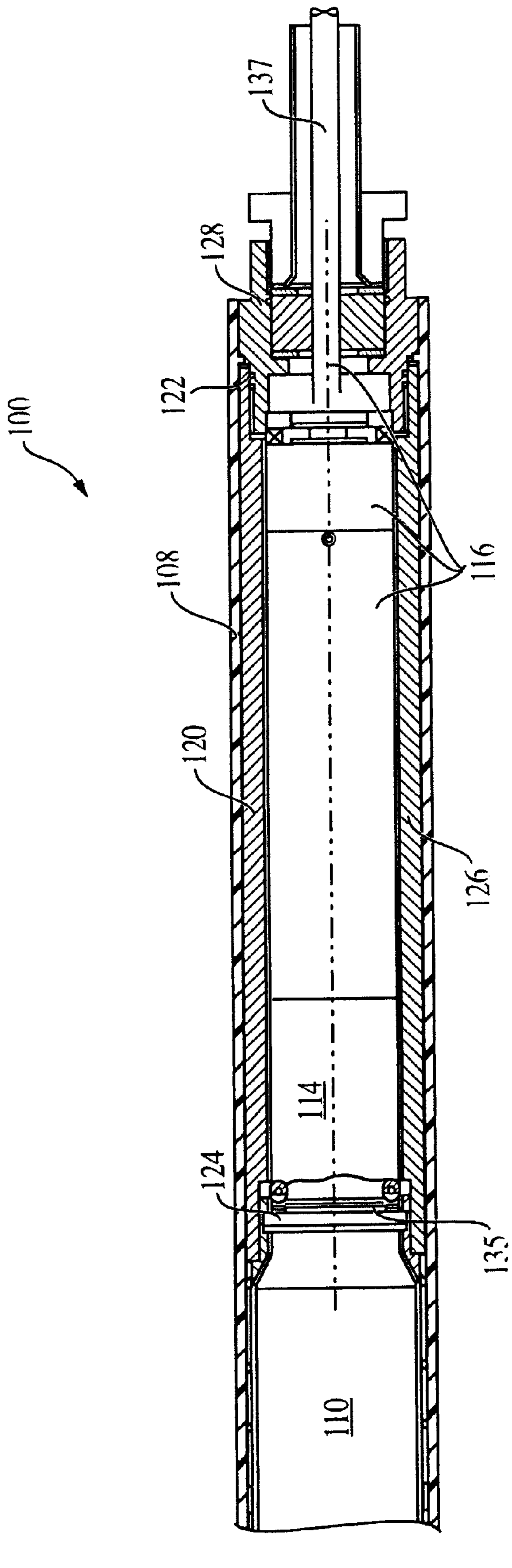
FIG. 12 is a cross-sectional view taken along line XII—XII of FIG. 11 showing a photomultiplier tube constructed in accordance with a preferred embodiment of the present invention.
Figure 13:
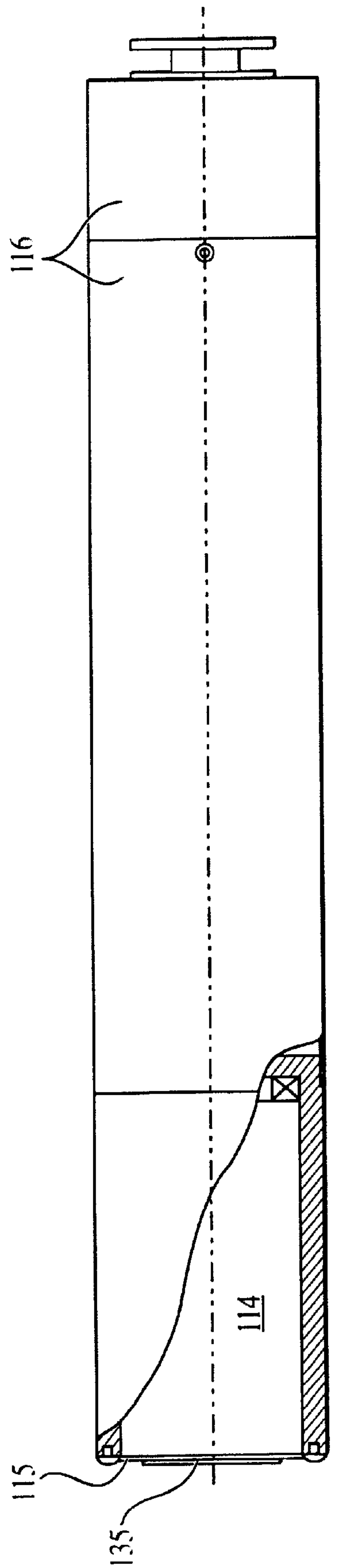
FIG. 13 is a partial cross-sectional view of the photomultiplier tube of FIG. 12.

The photomultiplier tube 114 encapsulated within the housing 139, and the power and logic elements 116, are housed within an explosion-proof enclosure 120 which includes an O-ring 122, a window 124, and a housing 126. Other electronics may be included within the housing 120, such as, for example, filtering and amplifier components (not shown). The enclosure 120 is itself within the elastomeric sleeve 108 (FIG. 12). Power enters, and controls and signals exit, the enclosure 120 through a conduit 137, which extends through a cap gland 128 (FIG. 12) into the enclosure 120. The window 124 is preferably formed of sapphire, or any other material which is resistant to harsh physical environments and transparent to light impulses. The window 124, along with an optical coupler 135 bonded directly to a faceplate 115 of the photomultiplier tube 114, serves to optically couple the scintillation element 110 to the photomultiplier tube 114 and to seal the enclosure 120 at one end, while the O-ring 122 serves to seal the enclosure 120 at the other end, thereby meeting the Mine Safety & Health Administration requirements for explosion-proof enclosures.

Figure 14:
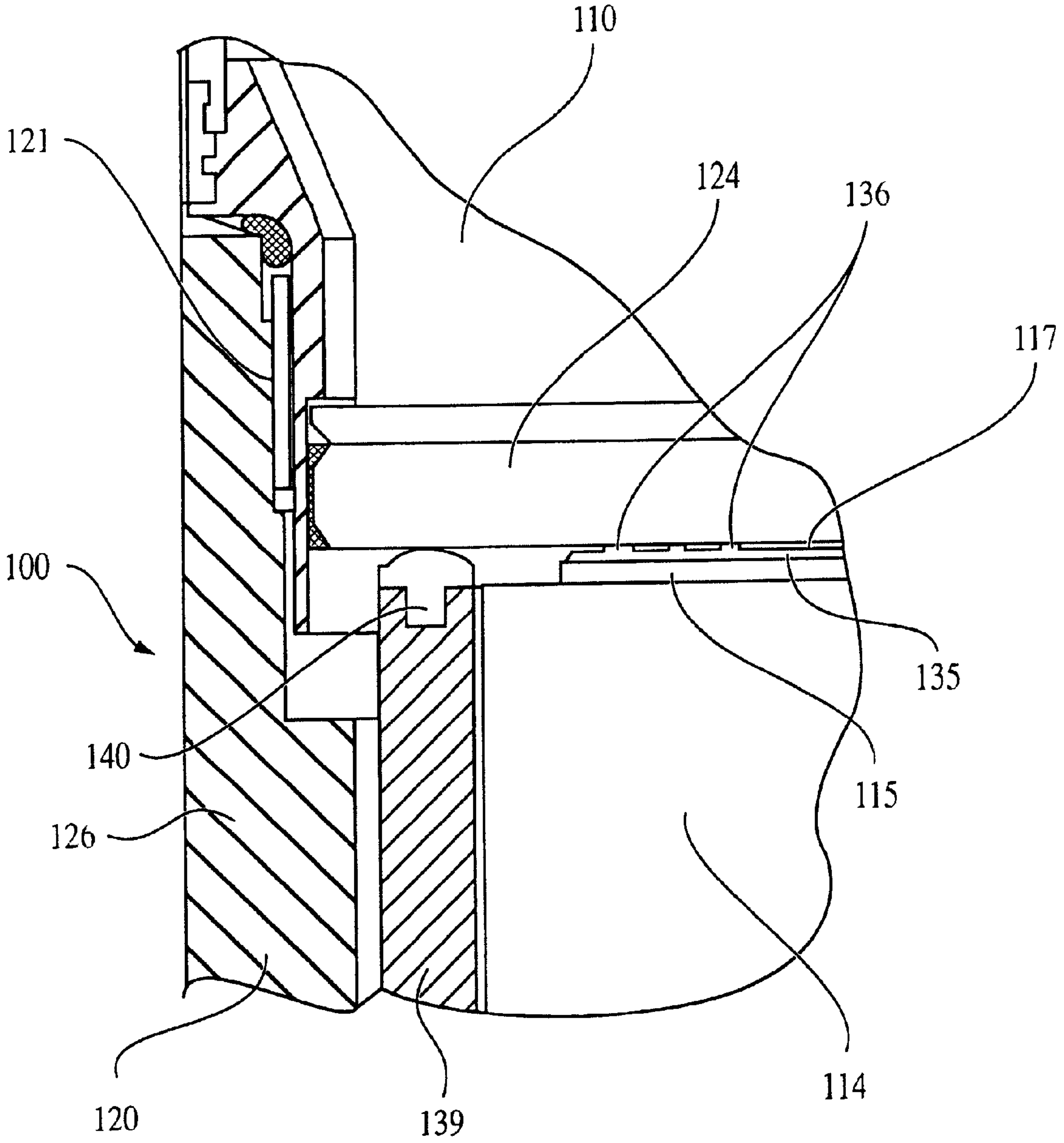
FIG. 14 is a partial cross-sectional view of the optical coupler of FIG. 13.

The optical coupler 135 includes rings 136 which assist in holding oil 117 in place between the coupler 135 and the window 124 (FIG. 14). The housing 139 includes a bumper ring 140 which is sized to abut the window 124, along with the optical coupler 135. A gap is present between the bumper ring 139 and the optical coupler 135. The explosion-proof housing 120 attaches with the housing for the scintillation element 110 by way of threads 121 (FIG. 14).

Figure 17:
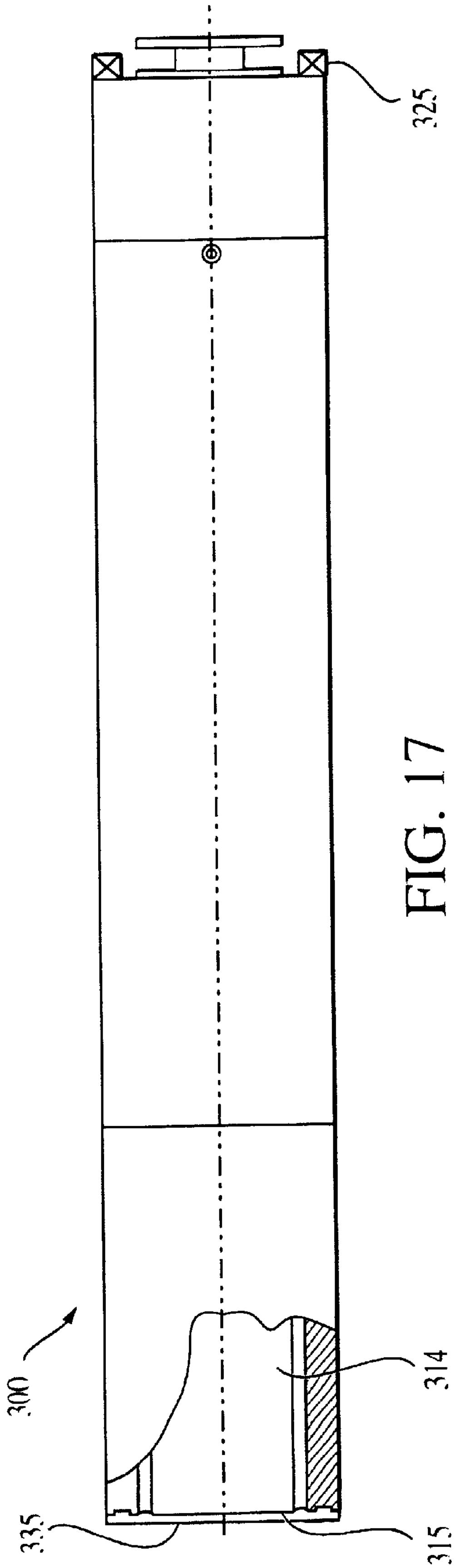
FIG. 17 is a partial cross-sectional view of a photomultiplier tube constructed in accordance with another preferred embodiment of the present invention.
Figure 18:
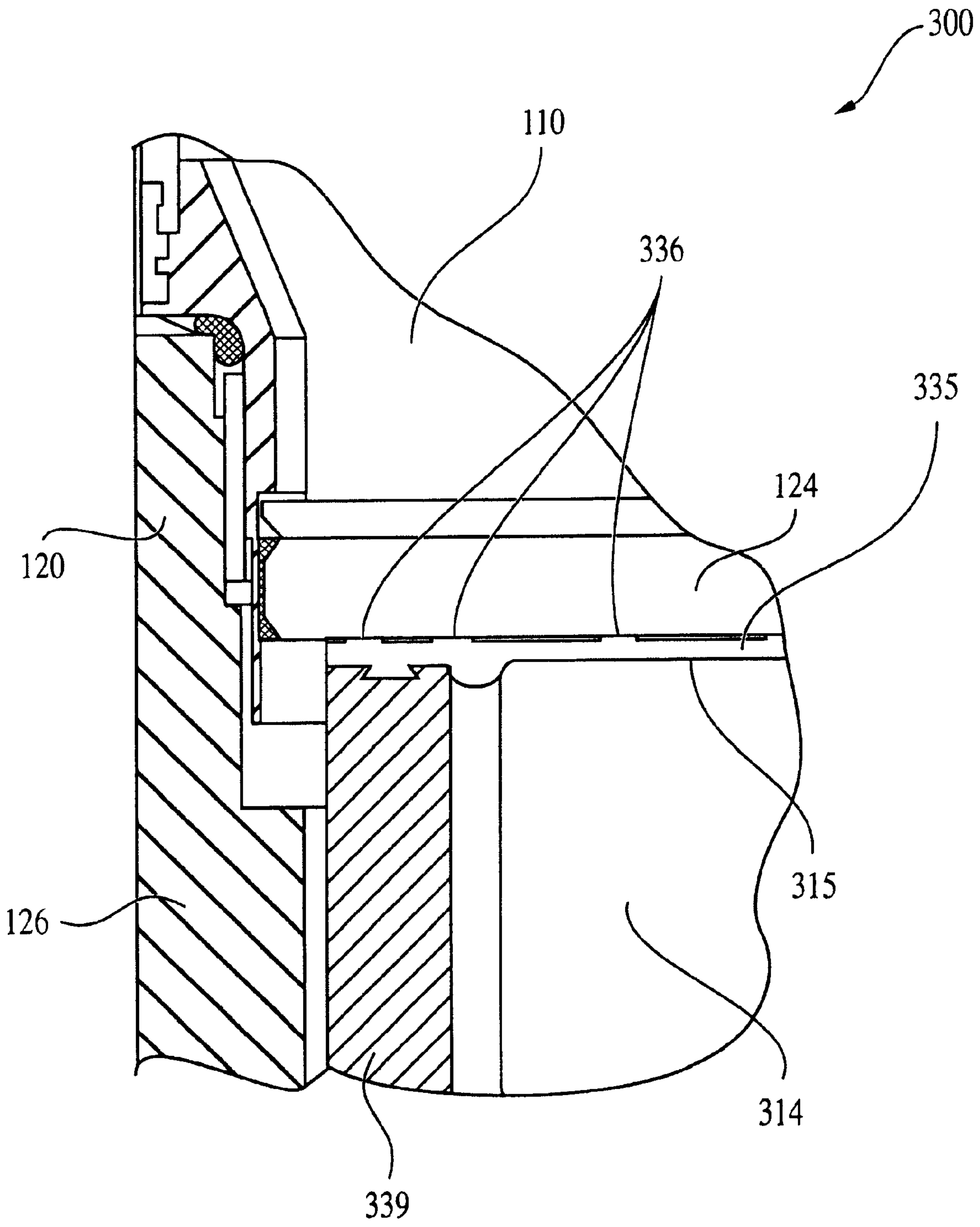
FIG. 18 is a partial cross-sectional view of the optical coupler tube of FIG. 17.

In an alternative embodiment, as illustrated in FIGS. 17–18, a radiation detector 300 includes the scintillation element 110, a photomultiplier tube 314 housed within a housing 339 and having a faceplate 315, the window 124, and an optical coupler 335 having rings 336. The housing 339 is not configured to receive a bumper ring. Instead, the optical coupler 335 extends radially beyond the photomultiplier tube 314 and extends over an end of the housing 339.

The positioning of the enclosure 120 within the elastomeric sleeve 108 provides certain advantages. First, the photomultiplier tube 114 and the power and logic elements 116 are made small to fit within the enclosure 120 so that they are dynamically isolated. Having the photomultiplier tube 114 and power and logic elements 116 all within the enclosure 120 allows these elements to function entirely within an electromagnetic interference-proofed housing which also meets explosion-proof standards. All of the signals from the logic elements 116 and the photomultiplier tube 114 are unaffected by the outside environment and thus free of electromagnetic interference, which is especially important when attempting to detect small levels of gamma radiation.

A critical aspect of designing a gamma detector for use near the cutting drum of a miner is to avoid the generation of noise added to the signal. Noise in the signals coming from a gamma detector in a mining environment originates in two ways. It can be mechanically induced or electrically induced. Mechanically induced noise can result when elements in the scintillation element move relative to each other, producing spontaneous emission of light. Similarly, the coupling mechanism between the scintillation element and the photomultiplier can be caused to move during vibration and produce light flashes. Parts within a photomultiplier tube can be made to vibrate, causing unwanted variations in the output that are also transmitted as signals. The present invention addresses these sources of mechanically induced noise by providing multiple levels of isolation from vibration and shock. Elements chosen for use in the detector 100 include a support system having a high resonant frequency. The current invention, in turn, provides for a significantly lower resonant frequency of the springs 118 that surround the scintillation crystal 110 within the rigid dynamic enclosure 120. Additional isolation is provided by the elastomeric material 108 that surrounds the rigid dynamic enclosure 120. The result of using this support system is to ensure that the resonant frequencies of the support elements, that surround the vibration sensitive elements, will not be dynamically coupled with the frequencies that are transmitted through the surrounding springs 118. By so doing, the sensitive elements will be protected from high, damaging vibrations and shock. Conventional approaches rely on simple mechanical isolators which require a large amount of space that is not available in the most desired locations. Further, without the armor provided in the illustrated embodiments, enclosures designed in a conventional fashion would be quickly destroyed by the direct impact of mining materials.

The illustrated embodiment of the present invention also effectively solves the problem of electrically induced noise produced by electrical motors and other devices on the mining equipment. This is accomplished by placing critical electrical elements such as power supplies, amplifiers, filters, discriminators, gain adjustment circuits, logic circuits and other electronics (i.e., the power source and logic elements 116) within a sealed enclosure 120. Electronic elements within the enclosure 120 are shielded from electromagnetic emissions from mining equipment. Amplifiers within the enclosure 120 boost the strength of the signals before they are transmitted from the detector to the control system for the miner. These specially conditioned and stronger signals are then essentially immune to the induced electromagnetic radiation as they pass through ruggedized cables to the miner control systems. Mine safety requirements dictate that electrical and electronic equipment be housed in enclosures that are explosion-proof in order to prevent ignition of dust or gas that may be around the detector. One unique feature of the illustrated embodiment is that the detector 100 is configured so that the explosion-proof requirement is met at the detector. Having the explosion-proof enclosure 120 at the detector allows the electronics to be at the detector so that the sensitive, low level signals do not have to be transmitted outside the protective structures to electronics which have been located at some distance away, often many feet. In addition, the explosion-proof enclosure 120 is protected by the armor detector assembly 30.

All this has been achieved in such a way so as to not require a large space, the small volume making it possible for the detector to be strategically placed near the target stratum. Explosion-proof boxes typically used to protect electrical systems on miners are so large that they generally do not survive in those locations.

Accuracy of the measurement of the thickness of the coal while it is being cut is dependent upon the speed of the measurement. In turn, the speed of the measurement is dependent upon the size and effectiveness of the scintillation crystal, or element, 110 and the openness of the view of the target material being cut. Conventional collimation techniques typically used to selectively allow radiation from one area to be measured while rejecting radiation from other areas generally are not effective for this application. Since the majority of gamma radiation in rock is of relatively low energy, the surface area of the scintillation element 110 is more critical than its volume because low energy radiation is generally captured near the surface of the element 110. For a given volume, the ideal proportion of a cylindrical scintillation element 110 is one having a high length to diameter ratio. Since the target area under the long cylindrical cutting drum 12 is a relatively narrow strip along the length of the cutter, the main axis of the scintillation element 110 should be parallel with this strip. Specifically, the dimension of the crystal 110 in the direction perpendicular to the axis of the target strip should be small so as to provide sufficient shielding of the scintillation element 110 from radiation originating from directions other than the target of interest.

The dynamic support system for the scintillation element 110 preferably should be effective for a sodium iodide (NaI) crystal having a high length to diameter ratio since NaI crystals are easily fractured by vibration, shock, shear or bending forces. Radial springs running the length of the element 110, and the springs 118 running the length of the shield 102 within which the scintillation element 110 is located provide this protection as well as prevent noise from being induced into the signal due to mechanical vibration.

Once the maximum-sized sodium iodide scintillation element 110 having a large length to diameter ratio has been properly supported to survive high vibration, another challenge is to provide mechanical shielding from objects being thrown against the detector 100 by the cutter drum 12. Such shielding must be accomplished without seriously obstructing the view by any portions of the surface of the scintillation element 110. This special viewing requirement has been accomplished by the guards 61 over the window area that allow most of the radiation along the length of the strip to reach points along the surface of the scintillation element without being obstructed by the guards. Internally to the detector, the radial springs 118 have been selectively used to minimize the attenuation of low energy radiation.

Collectively, these features, in addition to the special environmental protection afforded the electronics, allow for a highly sensitive detector that is capable of responding to the rapidly changing conditions as the coal is removed by the cutter drum 12. To further maximize the accuracy of the measurement, however, the movement of the cutter drum 12 is slowed down as it approaches the rock. The time added to the cutting stroke by slowing the movement of the boom 16 near the coal-rock interface 206 may be only three or four seconds, allowing for an accurate, automatic cutting decision which results in an overall saving of time for the total cutting cycle.

The scintillation crystal 110 may be formed of any suitable material which is capable of transforming radiation to light impulses, or signals. Preferably, the scintillation crystal 110 is formed of sodium iodide, the material known to produce the greatest intensity of light output. A typical size for the scintillation element 110 is 1.42 inches in diameter by 10 inches in length. The light impulses are transmitted through the window 124 to the photomultiplier tube, which transforms the light impulses into electrical signals. The electrical signals are analyzed to determine the distance to the coal-rock interface 206. For example, count rates above a pre-selected energy level are measured and compared with an input or calibrated reference, and the logical commands are issued to slow down the movement of the boom 16 and then to stop the boom 16.

The elastomeric sleeve 108 is transparent to radiation, and hence, alters only minimally, if at all, the amount of radiation entering the sensing equipment 100. A plurality of openings 106 extend through the housing 111 and the rigid enclosure 102 to allow radiation to enter into the sensing equipment 100 and be detected by the scintillation crystal 110. The openings 106 correspond with the apertures 50 in the main assembly 32 of the armored detector assembly 30.

By placing such electronic components within the enclosure 120, noise is greatly reduced and transmission of a high voltage from an external source to the photomultiplier tube 114 is avoided.

As noted above, one consideration for the armored detector assembly 30 is lessening the vibration and shock, known to produce noise in the signal within the sensing equipment 100, and especially within the scintillation crystal 110. Thus, the scintillation crystal 110, as well as the photomultiplier tube 114 and the power supply and logic elements 116 are encased within the elastomeric sleeve 108 which can absorb some of the noise producing vibration. The elastomeric sleeve 108, which may be a silicone rubber, also serves to protect the scintillation crystal 110 from water and/or chemicals used by the miner 10 for controlling dust. Further, the plurality of springs 118 extending around the circumference of the housing 111 provide additional protection.

The springs 118 may be adjusted to achieve a desired resonant frequency within the shield 102. Specifically, the springs 118 may be adjusted by altering their width, thickness, shape, and material type. By tuning the resonant frequency of the sensing equipment 100 with the springs 118, either alone or in conjunction With another set of springs (not shown) directly surrounding the scintillation crystal 110 within the elastomeric sleeve 108, the scintillation crystal 110 can be isolated from higher resonant frequencies and be inhibited from resonating with lower frequencies. The springs 118 are not shown in FIG. 12 for simplicity of illustration only.

Figure 11:
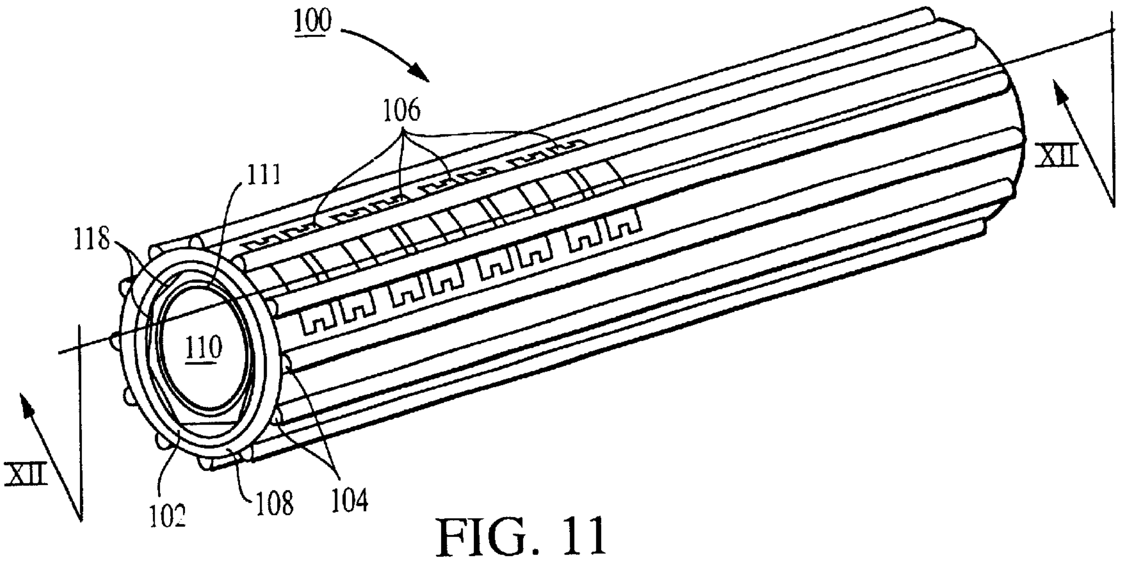
FIG. 11 is a perspective view of the detector of the armored detector assembly of FIG. 1 or FIG. 10.

The springs 118, which are nominally about 0.01 inches think and about 0.75 inches wide, may be placed so that they extend partially over the openings 106. The relative thinness of the sprigs 118 and their being supported by the elastomeric ridges 104 allows the springs 118 to extend over the openings 106 without adversely affecting the pathway of the incoming radiation at energies above approximately 80 keV. As illustrated in FIGS. 5 and 11, one of the springs 118 may be omitted over the openings 106, thereby leaving a gap of about 0.75 inches wide. The springs 118 adjacent the gap will increase attenuation to low energy radiation (30–80 keV), but will have only a minor effect on the higher energy incoming gamma radiation.

The sensing equipment 100 is loaded into and unloaded from the detector assembly 30 by removing the hatch assembly 74 from the main assembly 32. Alternatively, the sensing equipment 100 may be loaded into and unloaded from the detector assembly 30 through an opening 101 (FIG. 6).

Once the mining equipment 10 begins cutting the coal face 202, the scintillation crystal 110 takes in the radiation emanating from the rock material 204. Optical pulses from the scintillation element 110 are converted into electrical pulses by the photomultiplier tube 114. By counting the gross number of pulses (direct as well as scattered pulses), a determination is made as to the type of material that is being cut. Although there is some radiation emanating from the coal 200, the amount is low in intensity as compared to the radiation coming from the rock 204. As the boom 16 lowers the drum 12, allowing the picks 13 to cut into the coal 200, the amount of radiation reaching the detector 100 increases due to the coal 200 being removed and reducing the absorption of the radiation emanating from the rock 204. The radiation being measured will also be affected somewhat by the contour of the rock interface 206 such that an upturn of the interface 206 will increase the radiation being measured and a downturn will reduce the radiation being measure. Once the radiation from the rock 204 increases to a level selected by the operator, the detector logic elements 116 will issue a signal to slow the movement of the boom 16 to a predetermined rate. Such a slower rate provides more time for the detector to make more accurate measurements of the radiation levels. A second level may be selected by the operator that results in the boom 16 movement to be slowed even further, thus allowing even more accurate measurements. Finally, once an accurate measurement is made, the movement of the boom 16 is stopped.

Since the armored detector assembly 30 is welded flush with the mining equipment 10, rocks and other debris are less likely to rip the armored detector assembly 30 from the mining equipment 10. Any debris thrown up onto the window apertures 50 may be sprayed off, or at least whetted, with the spray nozzles 60. While coal is still being detected, the mining equipment 10 continues to advance through the uncut coal 200. Upon the sensing of a change in the radiation levels consistent with a change from coal to rock found at the coal-rock interface 206, the mining equipment 10 is halted and a new cutting direction is taken based upon new radiation information being input into and interpreted by the scintillation crystal 110, the photomultiplier 114 and the logic elements 116.

As is sometimes the case, the pulse counts registered from a radiation detector 100 positioned at the top portion 18 of the mining equipment 10 (and hence reading radiation through the roof) are different from the pulse counts from a radiation detector 100 positioned at the lower portion 20 (reading through the floor). Further, sometimes radiation count readings from, for example, the roof are "hot", or high while the readings from the floor are somewhat indeterminate. Given that coal scams generally travel in a slightly undulating formation having a roughly equivalent thickness throughout, it is further envisioned that one of the radiation detectors 100, coupled with a selected thickness value, can be utilized to more accurately mine the coal seam than is currently done by conventional methods.

For example, a potentiometer 500 (FIG. 1) may be placed at the back of the boom 16. The potentiometer 500 is an effective instrument for knowing the position of the cutting drum 12. By knowing where the coal rock interface 206 is from one of the radiation detectors and knowing that the thickness of the coal seam at that general location is an approximate thickness, the potentiometer 500 can be used to determine when the cutting should be halted on any cutting run where the readings from the other radiation detector 100 provide little guidance as to the location of the coal-rock interface 206. While this embodiment has been described in terms of a pair of radiation detectors 100, obviously the potentiometer 500 can be coupled with a single radiation detector 100.

Figure 15:
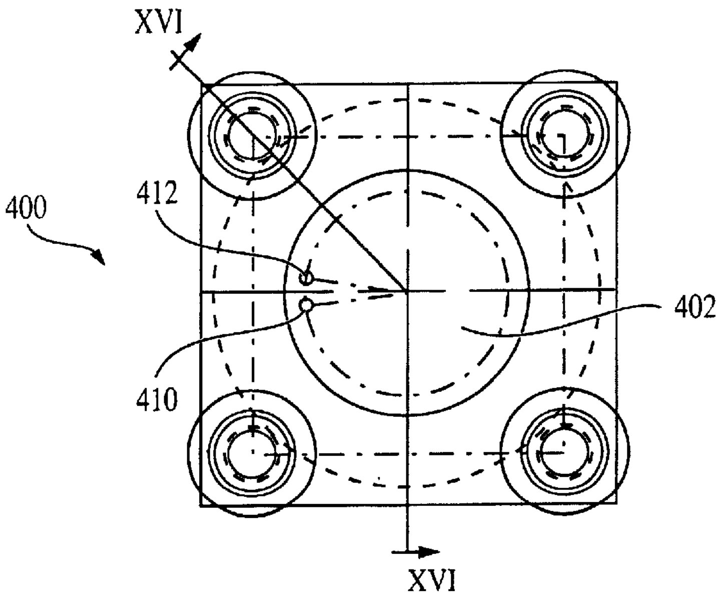
FIG. 15 is an end view of the optical coupler molder apparatus constructed in accordance with another preferred embodiment of the present invention.
Figure 16:
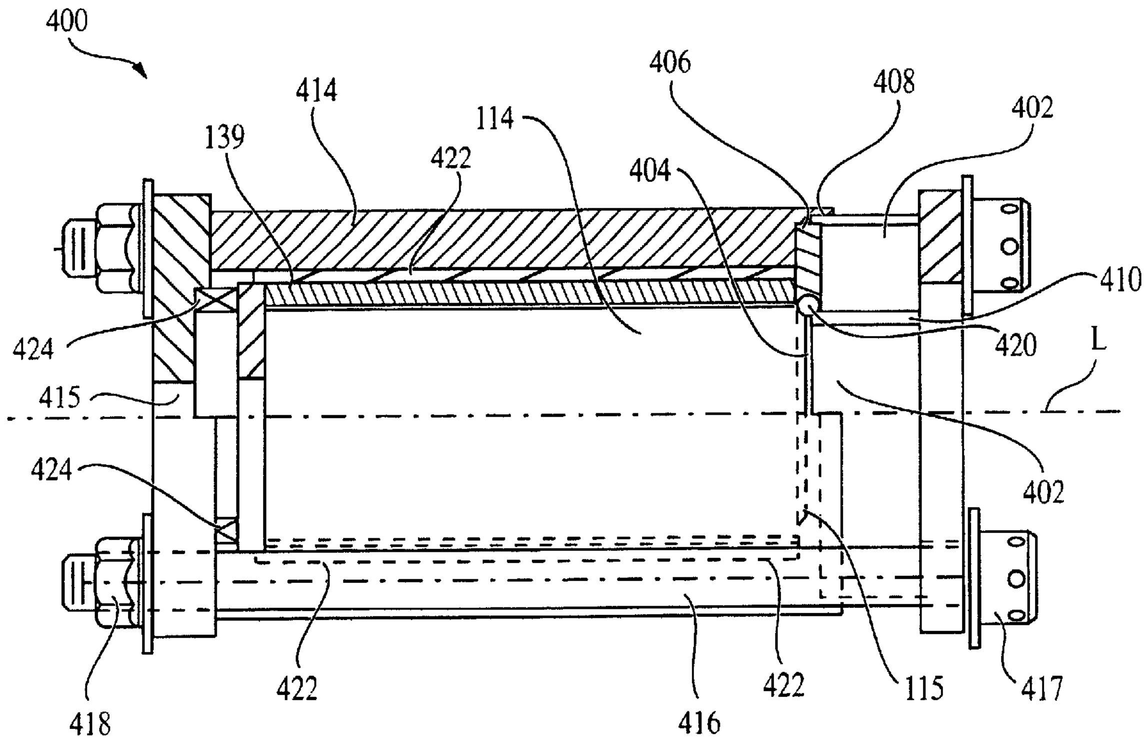
FIG. 16 is a cross-sectional view taken along line XVI—XVI of FIG. 15.

With reference to FIGS. 15–16, now will be described an optical coupler molding fixture 400 for bonding an optical coupler, such as the optical coupler 135, to the photomultiplier tube 114. The fixture 400 includes a frame 414 and a frame base 415 through which four bolts 416 extend. The photomultiplier tube 114 is positioned within the frame 414 between a spring 424 and a shim 406. Specifically, the spring 424 biases the photomultiplier tube housing 139 against the shim 406 to properly align the photomultiplier tube 114 within the frame 414. A plurality of centering shims 422 are positioned around the photomultiplier tube housing 139 to center the photomultiplier tube housing 139 within the frame 414. Preferably, there are at least three centering shims 422 used within the frame 414, although any number of centering shims 422 capable of centering the photomultiplier tube housing 139 may be used. Alternatively, any other suitable centering device, such as, for example, one or more O-rings, may be used to center the photomultiplier tube housing 139 within the frame 414.

The optical coupler 135 is formed with a mold 402 which includes a plate 408 positioned against the shim 406. Radially interior to the shim 406 is positioned an O-ring 420. A cavity 404 is created radially interior to the O-ring 420 between the photomultiplier tube 114 and the mold 402.

The optical coupler 135 is molded to the photomultiplier tube faceplate 115 within the fixture 414 with the fixture oriented so that the longitudinal axis L is parallel to the ground. The nuts 418 and the bolts 416 make up a clamping structure which presses the mold 402 against the shim 406 and provides the optical coupler material a non-leak space in which to cure. Specifically, the bolts 416 each have a bolt head 417 which extends radially over the mold 402, and the tightening of the nuts 418 on the bolts 416 presses the frame base 415 into the spring 424, further biasing the photomultiplier tube 114 toward the shim 406.

The material to form the optical coupler 135 is injected into the mold 402 through a fill hole 410. A vent hold 412 allows entranced air to exit the fixture 400 as the optical coupler material enters the cavity 404. The optical coupler material, which is preferably SYLGARD®, may be injected at ambient temperature. SYLGARD® is a silicon-based composition manufactured by Dow Corning Corporation. (Curing time for SYLGARD® may range from one week at ambient temperatures to four hours at 65° C.

The mold 402 can be machined to create any form desired for the optical coupler 135. Thus, the mold 402 can be machined to form the rings 136 or ridges on the optical coupler 135. The shim 406 and the O-ring 420 can be sized and configured to allow for adjustment in the thickness of the optical coupler 135. The optical coupler 135 may be as thin as less than 0.015 inches in thickness. If, for example, a thicker optical coupler 135 is desired, the shim 406 may be made thicker. The edge of the photomultiplier tube housing 139 which abuts the shim 406 is checked for its perpendicularity to the longitudinal axis L. Without perpendicularity, proper alignment of the photomultiplier tube 114 is less likely. Molding the optical coupler 135 to the faceplate 115 provides a surface generally accurately perpendicular to the longitudinal axis L, i.e., within 0.002 inch tolerance. This is so even if the faceplate 115 is not perpendicular to the photomultiplier tube housing 139.

The rings 136 may hold oil which enhances the optical coupling between the photomultiplier tube 114 and the scintillation element 110 or the window 124. Alternatively, the rings 136 may hold liquid SYLGARD® in place such that the optical coupler 135 may be pressed against either the window 124 or the scintillation element 110 and allowed to cure in that position, thereby bonding the optical coupler 135 to either the window 124 or the scintillation element 110.

The invention provides an armored detector assembly for use with mining equipment, such as continuous mining machines, for detecting coal and the boundary between a coal layer and a rock layer. While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although four bolts 416 are shown as part of the fixture 400, it is to be understood that any other suitable structures for compressing the mold 402 with the photomultiplier tube 114 are within the scope of the invention. An example of a suitable structure includes one or more clamps. Accordingly, the invention is not to be seen as limited by the foregoing description, but is only limited by the scope of the appended claims.

What is claimed as new and desired to be protected by Letters Patent of the United States is:

1. A photomultiplier apparatus for use with a gamma detector, comprising:
- a photomultiplier tube;
- a faceplate located on an end of said photomultiplier tube; and
- an optical coupler molded to said faceplate.

2. The photomultiplier apparatus of claim 1, further comprising a housing encapsulating said photomultiplier tube.

3. The photomultiplier apparatus of claim 2, wherein said housing includes a bumper ring.

4. The photomultiplier apparatus of claim 3, wherein said optical coupler extends radially within said bumper ring.

5. The photomultiplier apparatus of claim 2, wherein said optical coupler extends radially to an outer diameter of said housing.

6. The photomultiplier apparatus of claim 2, wherein said optical coupler includes one or more rings.

7. The photomultiplier apparatus of claim 2, wherein said optical coupler includes a plurality of ridges .

8. The photomultiplier apparatus of claim 2, wherein said optical coupler comprises a silicon-based composition.

9. The photomultiplier apparatus of claim 2, wherein said optical coupler is no thicker than 0.015 inches.

10. A gamma detector comprising:
- a scintillation element; and
- a photomultiplier apparatus, including:
  - a photomultiplier tube;
  - a faceplate located on an end of said photomultiplier tube; and
  - an optical coupler molded to said faceplate.

11. The detector of claim 10, further comprising a housing encapsulating said photomultiplier tube.

12. The detector of claim 11, wherein said housing includes a bumper ring.

13. The detector of claim 12, wherein said optical coupler extends radially within said bumper ring.

14. The detector of claim 11, wherein said optical coupler extends radially to an outer diameter of said housing.

15. The detector of claim 11, wherein said optical coupler includes one or more rings.

16. The detector of claim 11, wherein said optical coupler includes a plurality of ridges.

17. The detector of claim 11, wherein said optical coupler is formed of a silicon-based composition.

18. The detector of claim 11, wherein said optical coupler is no thicker than 0.015 inches.

19. The detector of claim 10, wherein said optical coupler is bonded to said scintillation element.

20. The detector of claim 10, further comprising a window located between said scintillation element and said photomultiplier tube.

21. The detector of claim 20, wherein said optical coupler is bonded to said window .

22. The detector of claim 20, wherein said win dow comprises sapphire.

23. A method of molding an optical coupler directly to a photomultiplier tube comprising the steps of:

placing the photomultiplier tube within an optical coupler molding fixture, said fixture including:

a frame with a frame base;

a clamping structure;

a shim; and a mold;

abutting one end of the photomultiplier tube against the shim;

centering the photomultiplier tube within the frame;

clamping the mold onto the shim;

injecting an optical material into the mold; and curing the material.

24. The method of claim 23, wherein the fixture further includes a spring, wherein said abutting step includes the spring biasing the photomultiplier tube toward the shim.

25. The method of claim 23, wherein said centering step includes locating at least one centering shim between the photomultiplier tube and the frame.

26. The method of claim 25, wherein said centering step includes locating three said centering shims between the photomultiplier tube and the frame.

27. The method of claim 23, wherein said clamping step includes:

inserting one or more bolts through the frame and the frame base, the bolts having heads which radially extend over the mold; and tightening nuts onto the bolts to bias the frame base, the spring, the photomultiplier tube and the mold toward the shim.

28. The method of claim 23, wherein the injecting step includes:

injecting the optical material into the mold through a fill hole; and venting the fixture through a vent hole.

29. The method of claim 28, wherein said fill and vent holes are provided through the mold.

30. The method of claim 23, wherein said curing step includes increasing the temperature for an extended period of time.

31. The method of claim 30, wherein the temperature is increased to about 65 degrees Celsius for a period of about four hours.

32. A method of molding optical couplers of various thicknesses to photomultiplier tubes, the method comprising the steps of:

(a) placing a first photomultiplier tube within an optical coupler molding fixture, said fixture including:

a frame with a frame base;

a clamping structure;

a first shim having a first thickness; and a mold;

(b) abutting one end of the first photomultiplier tube against the shim;

(c) centering the first photomultiplier tube within the frame;

(d) clamping the mold onto the shim;

(e) injecting an optical material into the mold;

(f) curing the material;

(g) removing the first photomultiplier tube;

(h) replacing the first shim with a second shim having a second thickness;

(i) placing a second photomultiplier tube within the fixture; and (j) repeating steps (b) through (f).

33. The method of claim 32, wherein the fixture further includes a spring, wherein said abutting step includes the spring biasing each of the photomultiplier tubes toward a respective one of the shims.

34. The method of claim 32, wherein said centering step includes locating at least one centering shim between each of the photomultiplier tubes and the frame.

35. The method of claim 34, wherein said centering step includes locating three said centering shims between each of the photomultiplier tubes and the frame.

36. The method of claim 32, wherein said clamping step includes:

inserting one or more bolts through the frame and the frame base, the bolts having heads which radially extend over the mold; and tightening nuts onto the bolts to bias the frame base, the spring, and each of the photomultiplier tubes toward the mold.

37. The method of claim 32, wherein the injecting step includes:

injecting the optical material into the mold through a fill hole; and venting the fixture through a vent hole.

38. The method of claim 37, wherein said fill and vent holes arc provided through the mold.

39. The method of claim 32, wherein said curing step includes increasing the temperature for an extended period of time.

40. The method of claim 39, wherein the temperature is increased to about 65 degrees Celsius for a period of about four hours.

41. An optical coupler molding fixture for molding an optical coupler onto a photomultiplier tube, the fixture comprising:

a frame with a frame base, said frame being adapted to receive a photomultiplier tube;

a shim;

a mold; and a clamping structure for clamping said frame base and said mold toward said shim.

42. The fixture of claim 41, further including a spring positioned adjacent to said frame base, said spring adapted to bias the photomultiplier tube toward said shim.

43. The fixture of claim 41, further including one or more centering shims for centering the photomultiplier tube within the fixture.

44. The fixture of claim 41, further comprising an O-ring positioned radially interior to said shim.

45. The fixture of claim 41, wherein said clamping structure includes one or more bolts having bolt heads and an equal number of nuts.

46. The fixture of claim 41, wherein said mold includes a fill hole adapted to receive material for forming the optical coupler.

47. The fixture of claim 46, wherein said mold includes a vent hole adapted to vent air from within the fixture displaced by the receipt of the material for forming the optical coupler.

* * * * *